Nov. 13, 1951    M. DE GROOTE ET AL    2,574,543
PROCESS FOR BREAKING PETROLEUM EMULSIONS
Filed Nov. 28, 1949
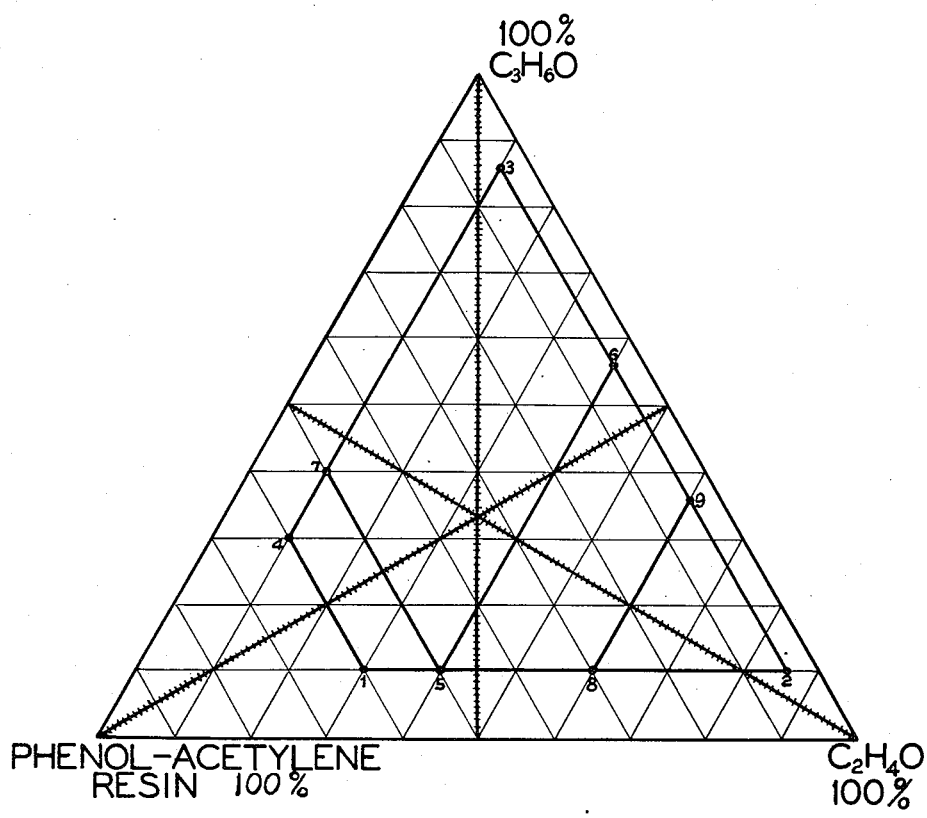
INVENTORS,
MELVIN DeGROOTE
BERNHARD KEISER
BY *Wells L. Church*
ATTORNEY.

Patented Nov. 13, 1951

2,574,543

UNITED STATES PATENT OFFICE 2,574,543

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware Application November 28, 1949, Serial No. 129,709

8 Claims. (Cl. 252—331)

The present invention relates to processes or procedures particularly adapted for preventing, breaking, or resolving emulsions of the water-in-oil type, and particularly petroleum emulsions. The present application is a continuation-in-part of our co-pending applications Serial Nos. 8,722 and 8,723, both filed February 16, 1948, and our co-pending application Serial No. 59,768, filed November 12, 1948. These applications have now matured into Patents Nos. 2,499,365 and 2,499,366, dated March 7, 1950, and 2,560,333, dated July 10, 1951.

Complementary to the above aspect of our invention is our companion invention concerned with the new chemical products or compounds used as the demulsifying agents in the herein described processes or procedures, as well as the application of such chemical compounds, products, and the like, in various other arts and industries, along with methods for manufacturing said new chemical products or compounds which are of outstanding value in demulsification. See our co-pending application Serial No. 129,710, filed November 28, 1949.

In our copending application above mentioned, Serial No. 59,768, filed November 12, 1948, the invention is concerned with a process for breaking petroleum emulsions of the water-in-oil type, characterized by subjecting the emulsion to the action of a demulsifier including hydrophile synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble, phenolic resin; said resin being derived at least in part by reaction with an acetylenic hydrocarbon so as to introduce an altered acetylenic radical as the linking structure between phenolic nuclei; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

The present invention is sub-generic to the invention described in the aforementioned copending application Serial No. 59,768, with the proviso that the alkylene oxide, instead of being selected from the five oxides mentioned, is limited to the use of two oxides, i. e., ethylene oxide and propylene oxide, with the further proviso that both oxides must be used in each instance, and in addition, the final product of reaction correlated to the percentage weight of initial reactants must come within the trapezoidal area defined by points 1, 2, 3 and 4 on the attached figure, all of which is conventional representation.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

Since the present invention is cogeneric to the inventions described in certain of our co-pending applications, previously noted, and particularly Serial No. 59,768, filed November 12, 1948, and since the difference rests in the nature of the oxyalkylation step, it obviously follows that the preparation of the initial raw materials, i. e., the resins, is identical with what is said in Serial No. 59,768, filed November 12, 1948, now Patent 2,560,333, granted July 10, 1951, and reference is made to that patent for a full and complete description of the resin and in particular, to Examples 1 through 24, 1b through 10b, and 1c through 5c for specific examples of suitable resins.

Having obtained a suitable resin of the kind described, such resin is subjected to treatment with a low molal reactive alpha-beta olefine oxide, so as to render the product distinctly hydrophile in nature, as indicated by the fact that it becomes self-emulsifiable or miscible or soluble in water, or self-dispersible, or has emulsifying properties.

As previously stated, the present invention is sub-generic to that described in our co-pending application Serial No. 59,768, filed November 12, 1948, in the sense that the present invention is limited to the use of both ethylene oxide and propylene oxide, so that the final compositions of matter come within the composition approximately defined by the trapezoidal area 1, 2, 3, and 4 of the chart in the accompanying drawing.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure; that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Attention is directed to the fact that the resins herein described must be fusible or soluble in an organic solvent. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenol-aldehyde resins of the type herein specified possess reactive hydroxyl groups and are oxyalkylation-susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein-contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipent hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde, such as formaldehyde. It is well known that the size and nature or structure of the resin polymer obtained varies somewhat with the conditions of reaction, the proportions of reactants, the nature of the catalyst, etc.

In our co-pending application Serial No. 8,730, filed February 16, 1948, now abandoned, in regard to phenol-aldehyde resins per se, we said as follows:

"Based on molecular weight determinations, most of the resins prepared, as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed, if desired. Molecular weight, of course, is measured by any suitable procedure, particularly by cryoscopic methods, but using the same reactants and using more drastic conditions of resinification, one usually finds that higher molecular weights are indicated by higher melting points of the resins and a tendency to decreased solubility. See what has been said elsewhere herein in regard to a secondary step involving the heating of a resin with or without the use of vacuum."

If such resins are given an after-treatment with acetylene, and such treatment, in order to meet the requisites herein stated, joins at least two resin molecules together by a linkage such as the following:

then, of course, there is an increase in molecular weight of at least double the previous value. Similarly, resins prepared in the manner of the commercial product, Koresin, such as an amyl, hexyl or octyl Koresin, yield relatively soft or tacky resins, in which there are only 3 or 4 or possibly 5 units. Such resins can be treated further with formaldehyde in the manner described so as to give resins of higher molecular weights than the initial resin. Therefore, without attempting to elaborate too closely, we simply desire to point out that the range of molecular weight of the various resins herein contemplated may go anywhere from a low range resin having 3 to 6 or 7 phenolic nuclei with approximately 4 to 5 nuclei as an average, up to ratios double these values or in excess thereof.

We desire to emphasize that the resins, prior to oxyethylation, must be fusible and organic solvent-soluble. They are, of course, essentially hydrophobe in character. The final product obtained by oxyalkylation must possess hydrophobe or surface-active properties or sub-surface-active properties, as herein described. For practical purposes, this means that there must be an amount of cross-linking sufficient to give insoluble products. In our co-pending application, Serial No. 8,730, filed February 16, 1948 (now abandoned), we have pointed out that insolubilization may arise in a number of ways, and particularly due to cross-linking in the resinification process, or in the oxyalkylation process. Therefore, everything that has been said in our aforementioned co-pending application Serial No. 8,730 in regard to the resinification process also applies in the instant application, as far as producing resins from phenols and acetylene goes, on the one hand, in comparison with resins derived from phenols and aldehyde, on the other hand.

In some cases, however, the situation in the instant case is complicated by the fact that there may be two resinification procedures, one involving an aldehyde and the other involving acetylene. In other words, a phenol-aldehyde resin may be subjected to treatment with acetylene, or inversely, a phenol-acetylene resin may be treated with an aldehyde. The most practical procedure is simply to take any mixture of phenols and treat it with acetylene or the equivalent, to obtain a fusible, organic solvent-soluble resin; or, if desired, prepare a phenol-aldehyde resin and treat such resin with acetylene.

As far as the preparation of the phenolaldehyde resins go for subsequent after-treatment with acetylene, attention is called to the following paragraph which appears in our aforementioned co-pending application Serial No. 8,730:

"We have pointed out that either an alkaline or acid catalyst is advantageously used in preparing the resin. A combination of catalysts is sometimes used in two stages: for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin, if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20, and, as far as we have been able to determine, such resins are free from methylol groups. As a matter of fact, it is probable that in acid-catalyzed resinifications, the methylol structure may appear only momentarily at the very beginning of the reaction, and in all probability, is converted at once into a more complex structure during the intermediate stage."

One procedure which can be employed in the use of a new resin to prepare products for use in the process of the invention is to determine the hydroxyl value by the Verley-Bölsing method or its equivalent. The resin as such or in the form of a solution as described, was then treated with a mixture of ethylene oxide and propylene oxide in presence of 0.5% to 2% of sodium methylate as a catalyst in step-wise fashion. The ratios of propylene oxide and ethylene oxide employed correspond to the ratios in the limiting points on the triangular graph or chart in the accompanying drawing, to wit, points 1, 2, 3 and 4. Our preference is to use the propylene oxide and then the ethylene oxide. If the resulting products meet the requirements as to surface-active properties noted elsewhere, the resin is entirely satisfactory. In some instances, such tests are best conducted by adding ethylene oxide first and then propylene oxide, or adding a mixture of the two alkylene oxides at the same time.

Attention is directed to the fact that in the subsequent examples reference is made to the step-wise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide, or mixture, slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C., as a rule, and thus can be readily oxyalkylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface-activity show unusual properties as the hydrophile character varies from a minimum to an ultimate maximum. One should not underestimate the utility of any of these products in a surface-active or sub-surface-active range without testing them for demulsification. A few simple laboratory tests which can be conducted in a routine manner will usually give all the information that is required.

For instance, a simple rule to follow is to prepare a resin having at least 3 phenolic nuclei and being organic solvent-soluble. Oxypropylate such resin, using the six following ratios of propylene oxide per phenolic unit equivalent: 2 to 1; 4 to 1; 6 to 1; 10 to 1; 15 to 1; and 20 to 1. Each oxypropylated sample thus obtained is treated with ethylene oxide in three different ratios, the first ratio being where the amount of ethylene oxide on a molal basis is just one-half that of the propylene oxide used in oxypropylation; the second ratio being where the amount of ethylene oxide is just equal to the amount of propylene oxide used on a molal basis; and the final ratio being where the amount of ethylene oxide used is 50% more than the propylene oxide used on a molal basis.

This gives a total of 18 samples, covering a fairly wide range. Prepare 0.5% and 5.0% solutions in distilled water, as previously indicated. A mere examination of such series will reveal generally an approximate range of minimum hydrophile character, moderate hydrophile character, and maximum hydrophile character. If any one of the three variations of the 2 to 1 propylene oxide ratio does not show minimum hydrophile effect by test of the solvent-free product, then one should test the capacity of the three variants to form an emulsion when mixed with xylene or other insoluble solvent. If neither test on the three variants shows the required minimum hydrophile property, further examination is required in regard to the other members of the series. Moderate hydrophile character should be shown by either a 6 to 1 or 10 to 1 ratio, based on the combined amount of both oxides. Such moderate hydrophile character is indicated by the fact that the sol in distilled water within the previously mentioned concentration range is a permanent translucent sol, when viewed in a comparatively thin layer, for instance, the depth of a test tube.

See also what has been said previously in regard to testing the new resin by preparing compounds corresponding to the limiting points on the triangular graph, points 1, 2, 3 and 4 in the accompanying drawing. Needless to say, such series can be prepared also in addition to further evaluating either the resin itself or to give a range of derivatives for any particular use, such as demulsification.

As has been stated in the earlier text, the present invention is concerned with the use of both propylene oxide and ethylene oxide. By using a comparatively large amount of ethylene oxide and a comparatively small amount of propylene oxide (assuming that the selected combination comes within the limits hereinafter specified) one can obtain a product which gives ultimate hydrophile character. However, ultimate hydrophile character of itself is not necessarily significant, because obviously, a resin treated with 15 to 20 or 30 moles of ethylene oxide per phenolic unit will be more water-soluble than a similar combination where one-fifth or one-third or one-half of the ethylene oxide is replaced by propylene oxide.

Therefore, even though the compounds or derivatives herein described are surface-active or subsurface-active from the standpoint described in co-pending application Serial No. 82,704, filed March 21, 1949 (now Patent No. 2,499,370 dated March 7, 1950), yet the limits are carefully set out by another set of facts we describe in the text immediately following. These limits make it extremely simple to prepare combinations of resins with propylene oxide and ethylene oxide which will meet the herein described requirements.

After preparing a large number of oxyethylated derivatives of these various resins, as described in Serial No. 82,704, filed March 21, 1949, and subsequently subjecting them to oxypropylation, we have found that not infrequently, and in fact, in many cases, the derivatives or mixtures obtained by such combined treatment, yielded products of greater value for many uses and particularly for demulsification of petroleum emulsions of the water-in-oil type. The same thing is true in regard to the oxypropylated resins described in the same aforementioned co-pending application, provided that there was after-treatment with ethylene oxide.

Ordinarily, the oxyalkylation is carried out in autoclaves provided with agitators or stirring devices. We have found that the speed of the agitation markedly influences the time reaction. In some cases the change from slow speed agitation, for example, in a laboratory autoclave with a stirrer operating at a speed of 60 to 20 R. P. M., to high speed agitation with the stirrer operating at 250 to 350 R. P. M., reduces the time required for oxyalkylation by one-half to two-thirds. Frequently, xylene-soluble products which give insoluble products by procedures employing comparatively slow speed agitation, give suitable hydrophile products when produced by similar procedure, but with high speed agitation, as a result, we believe, of the reduction in the time required with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, i. e., an operation in which the alkylene oxide is continuously fed to the reaction vessel, with high-speed agitation, i. e., an agitator operating at 250 to 350 R. P. M. Continuous oxyalkylation, other conditions being the same, is more rapid than batch oxyalkylation, but the latter is ordinarily more convenient for laboratory operation.

Previous reference has been made to the fact that in preparing final products or compounds of the kind herein described, particularly adapted for demulsification of water-in-oil emulsions, and for that matter, for other purposes, one should make a complete exploration of the wide variation in hydrophobe-hydrophile balance, as previously referred to. It has been stated, furthermore, that this hydrophobe-hydrophile balance of the oxyalkylated resins is imparted, as far as the range of variation goes, to a greater or lesser extent to the herein described derivatives. This means that one employing the present invention should take the choice of the most suitable derivative selected from a number of representative compounds, thus, not only should a variety of resins be prepared exhibiting a variety of oxyalkylations, not only from the standpoint of a varying ethylene oxide-propylene oxide ratio, but also from a standpoint of adding one oxide first and then the other, and also from the standpoint of adding both oxides simultaneously. This can be done conveniently in light of what has been said previously.

From a practical standpoint, using pilot plant equipment, for instance, an autoclave having a capacity of approximately 3 to 5 gallons, we have made a single run by appropriate selections in which the molal ratio of resin equivalent to ethylene oxide is one to one, 1 to 5, 1 to 10, 1 to 15, and 1 to 20, or the same ratios using propylene oxide, followed by addition of the other oxides through a somewhat similar range, i. e., 1 to 20 moles of propylene oxide after the initial addition of ethylene oxide, or 1 to 20 moles of ethylene oxide after the initial addition of propylene oxide. In any event, however, such ratios are conducted to keep the ultimate derivative within the trapezoidal area on the triangular graph or chart in the accompanying drawing, defined approximately by points 1, 2, 3 and 4. Furthermore, in making these particular runs we have used continuous addition of ethylene oxide, or propylene oxide.

In the continuous addition of ethylene oxide we have employed either a cylinder of ethylene oxide without added nitrogen provided that the pressure of the ethylene oxide was sufficiently great to pass into the autoclave, or we have used an arrangement, which, in essence, was the equivalent of an ethylene oxide cylinder with a means for injecting nitrogen so as to force the ethylene oxide in the manner of an ordinary seltzer bottle, combined with the means for either weighing the cylinder or measuring the ethylene oxide used volumetrically. In the case of propylene oxide we invariably used nitrogen pressure to cause the oxide to move into the autoclave.

Such procedure and arrangement for injecting liquids is, of course, conventional. In adding ethylene oxide or propylene oxide continuously there is one precaution which must be taken at all times. The addition of the oxide must stop immediately if there is any indication that reaction is stopped, or obviously, if reaction is not started at the beginning of the reaction period. Since the addition of ethylene oxide is invariably an exothermic reaction, whether or not reaction has taken place, can be judged in the usual manner by observing (a) Temperature rise or drop, if any; and
(b) Amount of cooling water or other means required to dissipate heat of reaction; thus, if there is a temperature drop without the use of cooling water or equivalent, or if there is no rise in temperature without using cooling water control, careful investigation should be made.

The resins employed are prepared in the manner described in our said Patent 2,560,333, and the resins are identified hereafter in terms of the example numbers of that patent. Instead of being prepared on a laboratory scale, there were prepared in 10 to 15-gallon electro-vapor-heated snythetic resin pilot plant reactors, as manufactured by the Blaw-Knox Company, Pittsburgh, Pennsylvania, and completely described in their Bulletin No. 2,087, issued in 1947, with specific reference to Specification No. 71—3965.

In preparing the derivatives we have used the following procedure, throughout. Prepare the resins with a certain amount of solvent, such as xylene, present purely as a convenience. We have treated the resins with propylene oxide and ethylene oxide in three different ways:

(a) Add the ethylene oxide first and then the propylene oxide;
(b) Add the propylene oxide first and then the ethylene oxide; and
(c) Use a mixture of propylene oxide and ethylene oxide, and make a single addition. In each case we have used an alkaline catalyst equivalent to approximately one-half to 1% of the total reaction mass in the final stage, or equivalent to one-fourth percent of alkaline catalyst, based on final compound. In some cases, as is obvious, such materials would be made step-wise for the reason that it is more convenient to produce a batch of oxypropylated resin, split it into three parts, for instance, and treat it with three different ratios of propylene oxide; or, inversely, prepare an oxypropylated resin and split it into three batches and treat it with various amounts of ethylene oxide. Briefly stated, the initial exploration was based on the combined derivatives previously mentioned in the earlier part of this text. Further exploration was based on preparing the following compounds in the three different ways mentioned. For convenience, at this stage the ratios are shown in molar ratio, rather than weight, although as will be pointed out subsequently, it is more convenient to operate and set the limits on a weight basis.

Reference to molal basis means the phenolic nucleus, plus a single adjoining bridge; i. e., the structural unit; or, stated another way, the radical attached to each phenolic hydroxyl. This reference to a molal ratio is distinguished from the obvious text, where reference is made to the molecular weight of the resin molecule as a whole, i. e., a molecule consisting of several structural units.

In each case the solvent was present and the amount of solvent in the final product is shown in each case. The solvent was xylene, and in some cases, was removed by vacuum distillation for examination of the final product.

| Resin | Propylene Oxide | Ethylene Oxide | Solvent, Per cent |
|---|---|---|---|
| 1 | 2 | 2 | 50.0 |
| 1 | 2 | 4 | 50.0 |
| 1 | 2 | 7 | 50.0 |
| 1 | 2 | 10 | 50.0 |
| 1 | 3.5 | 2.5 | 50.0 |
| 1 | 3.5 | 4.7 | 50.0 |
| 1 | 3.5 | 7 | 50.0 |
| 1 | 3.5 | 10 | 50.0 |
| 1 | 3.5 | 15 | 50.0 |
| 1 | 5 | 3 | 50.0 |
| 1 | 5 | 6 | 50.0 |
| 1 | 5 | 9 | 50.0 |
| 1 | 5 | 12 | 50.0 |
| 1 | 5 | 15 | 50.0 |
| 1 | 8 | 3 | 50.0 |
| 1 | 8 | 6 | 50.0 |
| 1 | 8 | 9 | 50.0 |
| 1 | 8 | 12 | 50.0 |
| 1 | 8 | 15 | 50.0 |
| 1 | 14 | 3 | 50.0 |
| 1 | 14 | 6 | 50.0 |
| 1 | 14 | 9 | 50.0 |
| 1 | 14 | 12 | 50.0 |
| 1 | 14 | 15 | 50.0 |
| 1 | 14 | 18 | 50.0 |
| 1 | 14 | 21 | 50.0 |

In each case a number of resins were employed. In fact, the bulk of the investigation was based on seven resins obtained by the action of acetylene on the following seven phenols:

1. Para-secondary butylphenol
2. Para-tertiary amylphenol
3. Para-phenylphenol
4. Para-octylphenol
5. Mixed para- and ortho-propylphenol
6. Cardanol
7. Side-chain hydrogenated cardanol This series so obtained in comparatively small sample lots was tested extensively and the data examined by plotting the composition on a percentage basis on a conventional triangular chart or graph, as shown in the drawing attached. In this chart each vertex represented 100% of the material indicated, i. e., a phenol-acetylene resin, ethylene oxide or propylene oxide. Likewise, the three lines connecting the vertices represent binary mixtures of the two particular constituents. Points in the area represent composition indicated in the usual manner.

Briefly stated, exploration revealed that the most effective compositions, from the standpoint of demulsification, and for that matter, for other purposes, were found within the area approximately defined by the tetrahedron whose points are 1, 2, 3 and 4. Within this tetrahedral area compounds whose compositions are found approximately within the parallelogram defined by points 3, 7, 5 and 6, were found most effective. The second most effective class of materials, from the standpoint of demulsification, were found within the tetrahedral area defined approximately by points 5, 8, 9 and 6.

The determining points in the large tetrahedron 1, 2, 3 and 4, are indicated in the following data, both on a weight basis and a molal ratio basis. Obviously, the weight basis is more satisfactory, because as different resins are employed the formulations for change in molecular weight of the resin unit are eliminated, to say nothing of the ease of producing the desired compounds, by merely following predetermined weight ratios indicated by the graph.

| Points | Resin | Ethylene Oxide | Propylene Oxide | Molal Ratio |
|---|---|---|---|---|
| | Per cent | Per cent | Per cent | |
| 1 | 60 | 30 | 10 | 1 M: 1.95 M: .505 M. |
| 2 | 4 | 86 | 10 | 1 M: 86 M: 7.58 M. |
| 3 | 4 | 10 | 86 | 1 M: 10 M: 65.2 M. |
| 4 | 60 | 10 | 30 | 1 M: .665 M: 1.51 M. |

A series of 9 oxyalkylated derivatives were made from the first five resins in the list above, i. e., para-secondary butylphenol, para-tertiary amylphenol, para-phenyl phenol, para-octylphenol, and mixed para- and octylpropylphenol. This particular series again was made in comparatively small amounts. In preparing these compounds we used a very small laboratory autoclave which handled approximately 15 to 50 grams of material as a starting point. In each instance the amount of solvent was added so that the final product, after the completion of the oxyalkylation step, represented fifty percent solvent. The solvent employed was xylene.

The following table shows the exact amount of materials employed, i. e., weight of resin employed, weight of ethylene oxide employed, weight of propylene oxide employed, total amount of solvent present in the reaction mass, and also the amount of flake caustic soda employed as a catalyst.

| Ex. No. | Point on Chart | Resin, Grams | Ethylene Oxide, Grams | Propylene Oxide, Grams | Wt. of Xylene, Grams | Flake Caustic Soda, Grams |
|---|---|---|---|---|---|---|
| A | 1 | 60 | 30 | 10 | 100 | .5 |
| B | 5 | 50 | 40 | 10 | 100 | .5 |
| C | 8 | 30 | 60 | 10 | 100 | .5 |
| D | 2 | 10 | 215 | 25 | 250 | 1.0 |
| E | 9 | 10 | 150 | 90 | 250 | 1.0 |
| F | 6 | 10 | 100 | 140 | 250 | 1.0 |
| G | 3 | 10 | 25 | 215 | 250 | 1.0 |
| H | 7 | 50 | 10 | 40 | 100 | .5 |
| I | 4 | 60 | 10 | 30 | 100 | .5 |

As stated, this series was made on a small laboratory scale from five different phenol-acetylene resins, i. e., butylphenol, amylphenol, phenylphenol, octylphenol and propylphenol. In each case 45 derivatives were made in three different ways:

(a) Adding all the ethylene oxide first and then propylene oxide;

(b) Adding all propylene oxide first and then ethylene oxide;

(c) Mixing the two oxides and adding them simultaneously.

We have prepared also a number of similar derivatives in which the previously mentioned seven resins prepared from a selected phenol and acetylene were given an after-treatment with an aldehyde so as to produce a more complex resin in which there was present more than one type of linking unit, i. e., one derived from acetylene and one derived from an aldehyde. The same applies to some resins which were prepared in a reverse manner, in which the phenol-aldehyde resin was subjected to after-treatment with acetylene.

In our two co-pending applications Serial Nos. 129,707 (now Patent No. 2,557,081, dated June 19, 1951) and 129,708, filed November 28, 1949, we pointed out that resins derived exclusively from phenols, as specified therein, and formaldehyde, react the same way in the ethylene oxide-propylene oxide treatment, as do resins derived exclusively from comparable phenols and acetylene. It follows obviously that such resins in which the mixed groupings appear, i. e., both acetylene groupings and aldehyde groupings, must fall within the same limiting characteristic, and for this reason and for purpose of brevity, the rest of the description will be concerned largely with the phenol-acetylene resins, although the mixed type resin acts substantially the same and is susceptible to the same treatment, as far as oxyalkylation goes, with the same results.

We again desire to point out that the amount of alkaline catalyst used is not critical. This is true whether the catalyst be caustic soda, caustic potash, sodium methylate, or any other suitable catalyst. The amount which we regularly employed has varied from 1%, based on the resin alone, to 1%, based on the resin and oxides, although in many cases the reaction has been speeded by using approximately twice this amount of caustic. We are inclined to believe that whenever the amount of caustic represents more than 2% of the reactants present, ignoring inert solvent, that there may be some tendency to form cyclic polymers with the alkylene oxide, although this is purely a matter of speculation. For this reason, whether justified or not, we have usually avoided use of excess amounts of catalyst.

Referring now to the earlier reference as to the most suitable combinations, it will be noted, as previously stated, that they fall not only within the trapezoidal area defined by points 1, 2, 3 and 4, on the accompanying drawing, but more specifically within the parallelogram which represents part of the trapezoidal area. This parallelogram is defined approximately by points 5, 6, 3 and 7. We have prepared a large number of derivatives which come within this preferred area, i. e., within the area of the parallelogram, and since such derivatives are the most effective demulsifiers, and also most effective for other purposes, we are including these data in considerable detail. It is understood, of course, in each instance the composition is based on the assumption that the percentage by weight basis is on a statistical basis, which it obviously must be, and assumes completeness of reaction. This applies, of course, not only to these examples, but also to all previous examples. In preparing these examples we have used a xylene solution obtained by dissolving the resin. The final product in all instances was adjusted to 50% xylene and 50% resin. This was purely a matter of convenience. In this particular series, and, in fact, any other series where large amounts of a phenol resin were employed, we have used commercially available para-tertiary butylphenol acetylene resin. The amounts of other resins available were limited, and thus, part of the experiments were conducted on a laboratory scale.

The resins employed in the first series of compounds which are identified as Examples XAA1, through and including XFF1, were obtained from amylphenol acetylene resins, and which, for all practical purposes, are nothing more than the amylphenol homologues of the commercially available butyl acetylene resin. The amount of resin employed, the amount of ethylene oxide employed, and the amount of propylene oxide employed, are given in grams in the following six examples. The weight of caustic soda employed is indicated in grams. In all these examples all propylene oxide was added first and then all ethylene oxide.

| Ex. No. | Resin Grams | Ethylene Oxide Grams | Propylene Oxide Grams | Flake Caustic Grams |
|---|---|---|---|---|
| XAA1 | 62.4 | 32.5 | 42.0 | .75 |
| XBB1 | 45.7 | 35.0 | 75.0 | .75 |
| XCC1 | 34.5 | 25.0 | 90.5 | .75 |
| XDD1 | 31.4 | 25.0 | 144.8 | 1.0 |
| XEE1 | 26.5 | 41.0 | 122.5 | 1.0 |
| XFF1 | 28.4 | 43.2 | 75.0 | .75 |

A second set of six examples designated as Examples XAA2, through XFF2, were prepared in the same manner, using the same ratios, except that the resin employed was that made from para-secondary butylphenol. This resin was again substantially the analogue of commercially available butylphenol acetylene resin, except that the commercial product was obtained from a para-tertiary butylphenol, and this resin was obtained from a para-secondary butylphenol. All the subsequent resins were the same analogues of commercial butylphenol acetylene resins, except that the other phenols were employed as previously noted and as herein specified.

For example, in the third series of six compounds the same ratios were used and identified as Examples XAA3, through XFF3. The resin employed was prepared from acetylene and para-phenylphenol.

A fourth series of six examples were prepared, using the same ratios and identified as Example XAA4, through XFF4, and prepared from para-octylphenol.

Similarly, a fifth series was prepared from the resin obtained by reaction between mixed para- and orthophenol and acetylene, designated as XAA5, through XFF5.

Likewise, a sixth series was prepared from the only presently commercially available phenol—the resin obtained from para-tertiary butylphenol and acetylene—Koresin as sold in the open market. This last series was indicated as XAA6, through XFF6.

In all these series the same ratios of reactants as indicated in Examples XAA1 through XFF1 were used. The procedure was the same as has been described previously in regard to oxyethylation and oxypropylation. In each instance the propylene oxide was added first and then the ethylene oxide.

In a second series of thirty compounds the same ratios were preserved in every respect, except that ethylene oxide was added first and then propylene oxide. These series are indicated by the designations YAA1, YBB1, YCC1, YDD1, YEE1, and YFF1, for the amylphenols, and the corresponding designation for the others.

A third series was prepared, using the same ratios except that ethylene oxide and propylene oxide were mixed together and added simultaneously so that oxyalkylation was a random or indifferent oxyalkylation, in the sense that no control was employed to determine which oxide combined first with the resin. This third series is indicated by the prefix Z instead of X and Y.

Examination of results in demulsification tests shows that the X series was best, the Y series very good, and the Z series good.

In the final comparison all the resins were on an equal dilution basis, 50% of the oxyalkylated derivatives and 50% xylene.

The oxyalkylation of a resin of the kind herein described with a properly selected alkylene oxide, will produce a material, which, if oxyalkylation is extensive enough, becomes clearly soluble in water, so that a dilute solution, for instance, 1% in water at 22.5° C. in an ordinary test tube of approximately one-half inch thickness, produces a solution or sol which is transparent to the eye. Needless to say, this does not apply to any alkylene oxide. For instance, the reaction product of a mole or a few moles of phenyl ethylene oxide with a water-soluble product, yields a water-insoluble product. Even water will serve to illustrate this change in property. Treatment of a resin with sufficient ethylene oxide will produce a product having the characteristics noted and which apparently show at least some detersive properties. Replacing the ethylene oxide with butylene oxide does not produce a water-soluble product, regardless of how much butylene oxide is used. If one replaces the butylene oxide with propylene oxide, the product will show some hydrophile effect, but does not yield a clear solution. In fact, the resultant, using propylene oxide alone, is usually a product which will dissolve in xylene, but will not even suspend in water. By using a mixture of propylene oxide and ethylene oxide, one can obtain a derivative which is somewhere in between these two limits, i. e., it may suspend in water as an opaque colloidal sol, or may perhaps not do quite this well, or perhaps even better, but in any event, does not give a clear solution when tested in the manner previously indicated, and does not have any detersive properties. All the products which we have examined which come within the parallelogram on the graph indicated by points 5, 6, 3 and 7, are of this "semi-soluble" or non-detersive type.

When a hydroxylated material is subjected to oxyalkylation, particularly in such instances where a plurality of moles of the alkylene oxide are used per hydroxyl, one does not obtain a compound but a mixture, which, on a statistical basis, corresponds to the predetermined ratios.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil and water-solubility. However, since such reagents are frequently used in a ratio of 1 to 10,000, or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or sub-surface- or surface-active. Such resins, in turn, are oxyalkylation-susceptible, water-insoluble, organic solvent-soluble, fusible phenolic resins, obtained, in part, at least, by the use of an acetylenic hydrocarbon and derived from difunctional or other suitable phenols. Based on actual large scale application in a large number of oil fields in the United States and certain foreign countries, we believe that this type of material, either as such or in the form of derivatives, will ultimately be employed in no less than 50% of all chemical demulsifying agents used throughout the world.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example XAA6, with 15 parts by weight of xylene and 10 parts by weight of isopropyl alcohol, an excellent demulsifier is obtained. Selection of the solvent will vary, depending upon the solubility characteristics of the oxyalkylated product, and of course, will be dictated, in part, by economic considerations, i. e., cost.

As noted above, the products herein described may be used not only in diluted form, but also may be used admixed with some other chemical demulsifiers.

An illustration is the use of a mixture comprising:

Oxyalkylated derivative, for example, the product of Example XAA6, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of oxyalkylated resinous compounds or derivatives thereof for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative, rather than the resin itself.

Having thus described our invention, what we claim as new and desire to secure by Letters Patent is:

1. A process for breaking petroleum emulsions of the water-in-oil type, characterized by subjecting the emulsion to the action of a demulsifier including hydrophile synthetic products; said hydrophile synthetic products being oxyalkylation products of (a) Both ethylene oxide and propylene oxide; and (b) An oxyalkylation-susceptible, fusible, organic solvent-soluble, water-insoluble phenolic resin; said resin being derived at least in part by reaction with an acetylene hydrocarbon so as to introduce an alternate acetylenic radical as the linking structure between phenolic nuclei; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation step reactants, i. e., resin, ethylene oxide and propylene oxide, on a percentage weight basis must fall approximately within the area defined by the trapezoid 1, 2, 3 and 4 on the accompanying drawing; and with the final proviso that the hydrophile properties of said oxyalkylated resin in an equal weight of xylene are sufficient to produce an emulsion when said xylene solution is shaken vigorously with one to three volumes of water.

2. A process for breaking petroleum emulsions of the water-in-oil type, characterized by subjecting the emulsion to the action of a demulsifier including hydrophile synthetic products; said hydrophile synthetic products being oxyalkylation products of (a) Both ethylene oxide and propylene oxide; and (b) An oxyalkylation-susceptible, fusible, organic solvent-soluble, water-insoluble phenolic resin; said resin being derived by reaction with an acetylene hydrocarbon so as to introduce an alternate acetylenic radical as the linking structure between phenolic nuclei; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation step reactants, i. e., resin, ethylene oxide and propylene oxide, on a percentage weight basis must fall approximately within the area defined by the trapezoid 1, 2, 3 and 4 on the accompanying drawing; and with the final proviso that the hydrophile properties of said oxyalkylated resin in an equal weight of xylene are sufficient to produce an emulsion when said xylene solution is shaken vigorously with 1 to 3 volumes of water.

3. A process for breaking petroleum emulsions of the water-in-oil type, characterized by subjecting the emulsion to the action of a demulsifier including hydrophile synthetic products; said hydrophile synthetic products being oxyalkylation products of (a) Both ethylene oxide and propylene oxide; and (b) An oxyalkylation-susceptible, fusible, organic solvent-soluble, water-insoluble phenolic resin; said resin being derived by reaction with acetylene so as to introduce an alternate acetylenic radical as the linking structure between phenolic nuclei; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation step reactants, namely, resin, ethylene oxide and propylene oxide, on a percentage weight basis must fall approximately within the area defined by the trapezoid, 1, 2, 3 and 4 on the accompanying drawing; and with the final proviso that the hydrophile properties of said oxyalkylated resin in an equal weight of xylene are sufficient to produce an emulsion when said xylene solution is shaken vigorously with 1 to 3 volumes of water.

4. A process for breaking petroleum emulsions of the water-in-oil type, characterized by subjecting the emulsion to the action of a demulsifier including hydrophile synthetic products; said hydrophile synthetic products being oxyalkylation products of (a) Both ethylene oxide and propylene oxide; and (b) An oxyalkylation-susceptible, fusible, organic solvent-soluble, water-insoluble phenolic resin; said resin being derived by reaction with acetylene so as to introduce an alternate acetylenic radical as the linking structure between phenolic nuclei; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation step reactants, i. e., resin, ethylene oxide and propylene oxide, on a percentage weight basis must fall approximately within the area defined by the parallelogram 5, 6, 3 and 7 on the accompanying drawing; with the final proviso that the hydrophile properties of said oxyalkylated resin in an equal weight of xylene are sufficient to produce an emulsion when said xylene solution is shaken vigorously with 1 to 3 volumes of water.

5. A process for breaking petroleum emulsions of the water-in-oil type, characterized by subjecting the emulsion to the action of a demulsifier including non-detersive hydrophile synthetic products; said non-detersive hydrophile synthetic products being oxyalkylation products of (a) Both ethylene oxide and propylene oxide; and (b) An oxyalkylation-susceptible, fusible, organic solvent-soluble, water-insoluble phenolic resin; said resin being derived by reaction with acetylene so as to introduce an alternate acetylenic radical as the linking structure between phenolic nuclei; said oxyalkylated resin being characterized by the introduction into the resin molecule of a plurality of divalent $C_2H_4O$ and $C_3H_6O$ radicals, with the proviso that the composition of said non-detersive hydrophile synthetic products, based on a statistical average and assuming completeness of reaction, and calculated back to the three oxyalkylation step reactants, i. e., resin, ethylene oxide, and propylene oxide, on a percentage weight basis must fall approximately within the area defined by the parallelogram 5, 6, 3 and 7 on the accompanying drawing; and with the final proviso that the hydrophile properties of said non-detersive oxyalkylated resin in an equal weight of xylene are sufficient to produce an emulsion when said xylene solution is shaken vigorously with 1 to 3 volumes of water.

6. The process of claim 5, wherein the resin is derived from para-tertiary butylphenol 7. The process of claim 5, wherein the resin is derived from para-tertiary amylphenol.

8. The process of claim 5, wherein the resin is derived from para-octylphenol.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,040,212 | Orthner | May 12, 1936 |
| 2,076,624 | De Groote | Apr. 13, 1937 |
| 2,454,541 | Bock et al. | Nov. 23, 1948 |